United States Patent
Wu

(10) Patent No.: US 10,001,184 B2
(45) Date of Patent: Jun. 19, 2018

(54) HYDRAULIC ANTI-LOCK BRAKE WHEEL CYLINDER AND AXLE BRAKING SYSTEM

(71) Applicant: Maoting Wu, Qingdao (CN)

(72) Inventor: Maoting Wu, Qingdao (CN)

(*) Notice: Subject to any disclaimer, the term of this patent is extended or adjusted under 35 U.S.C. 154(b) by 0 days. days.

(21) Appl. No.: 15/311,668

(22) PCT Filed: May 20, 2015

(86) PCT No.: PCT/CN2015/079336
§ 371 (c)(1),
(2) Date: Nov. 16, 2016

(87) PCT Pub. No.: WO2015/176654
PCT Pub. Date: Nov. 26, 2015

(65) Prior Publication Data
US 2017/0108066 A1    Apr. 20, 2017

(30) Foreign Application Priority Data

May 20, 2014   (CN) .......................... 2014 1 0213110

(51) Int. Cl.
*F16D 65/18*   (2006.01)
*B60T 13/14*   (2006.01)
(Continued)

(52) U.S. Cl.
CPC .............. *F16D 65/18* (2013.01); *B60T 13/14* (2013.01); *B60T 13/686* (2013.01);
(Continued)

(58) Field of Classification Search
CPC ........ F16D 65/18; F16D 65/183; F16D 65/22; F16D 2121/04; F16D 2121/06
(Continued)

(56) References Cited

U.S. PATENT DOCUMENTS 3,954,305 A * 5/1976 Ingram ................... B60T 8/348
188/170
4,781,276 A   11/1988 Berisch et al.
2010/0300818 A1   12/2010 Kamio

FOREIGN PATENT DOCUMENTS

CN    103994163 A    8/2014
CN    104214253 A    12/2014
(Continued)

OTHER PUBLICATIONS

International Search Report for PCT/CN2015/079336, ISA/CN, Haidian District, Beijing, dated Sep. 2, 2015.
(Continued)

*Primary Examiner* — Thomas J Williams
(74) *Attorney, Agent, or Firm* — Harness, Dickey & Pierce, P.L.C.

(57) ABSTRACT

A hydraulic anti-lock brake wheel cylinder includes a cylinder body with a first cavity having an end cover, a first oil chamber interface, a second oil chamber interface and an oil return interface. A first piston is arranged within the first cavity, a first spring between the first piston and the end cover, a first oil chamber between the first piston and a bottom of the first cavity, the first oil chamber communicating with the first oil chamber interface; the first piston having a second cavity, a second piston arranged within the second cavity; a second spring between the second piston and a bottom of the second cavity, a second oil chamber between the second piston and a top of the second cavity; a core tube within the cylinder body, and one end of the core tube communicating with the second oil chamber, the other end communicating with the second oil chamber interface; the oil return interface communicating with the first oil chamber when the first piston moves outwards to a set position.

22 Claims, 9 Drawing Sheets

(51) Int. Cl.
　　　*B60T 13/68*　　　(2006.01)
　　　*F16D 121/04*　　(2012.01)
　　　*F16D 125/06*　　(2012.01)

(52) U.S. Cl.
　　　CPC ....... *B60T 2270/10* (2013.01); *F16D 2121/04* (2013.01); *F16D 2125/06* (2013.01)

(58) Field of Classification Search
　　　USPC ................................ 188/368, 369, 370, 170
　　　See application file for complete search history.

(56) References Cited

FOREIGN PATENT DOCUMENTS

| | | |
|---|---|---|
| CN | 204025457 U | 12/2014 |
| FR | 2242004 | 8/1973 |

OTHER PUBLICATIONS

Written Opinion if the ISA for PCT/CN2015/079336, ISA/CN, Haidian District, Beijing, dated Sep. 2, 2015.
EPO Extended Search Report dated Apr. 4, 2018.
KR Office Action dated Feb. 27, 2018.

\* cited by examiner

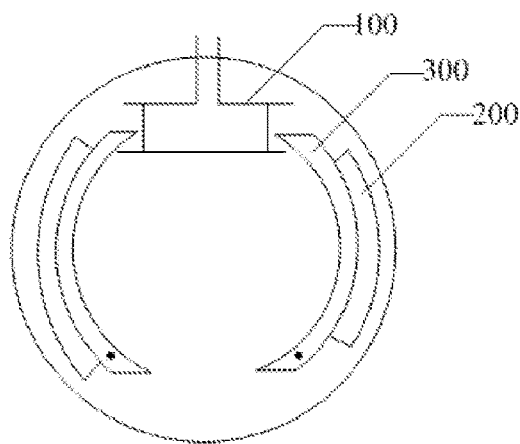 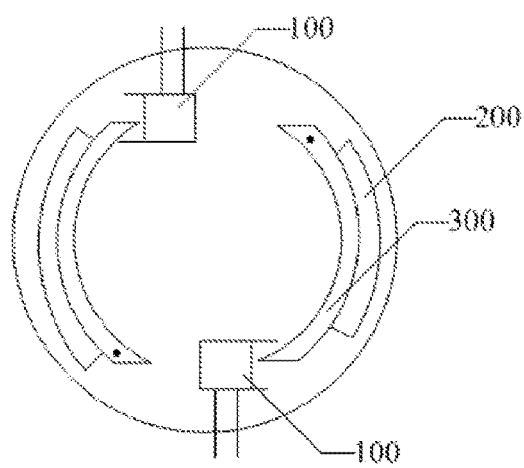
Fig. 14a　　　　　　　Fig. 14b
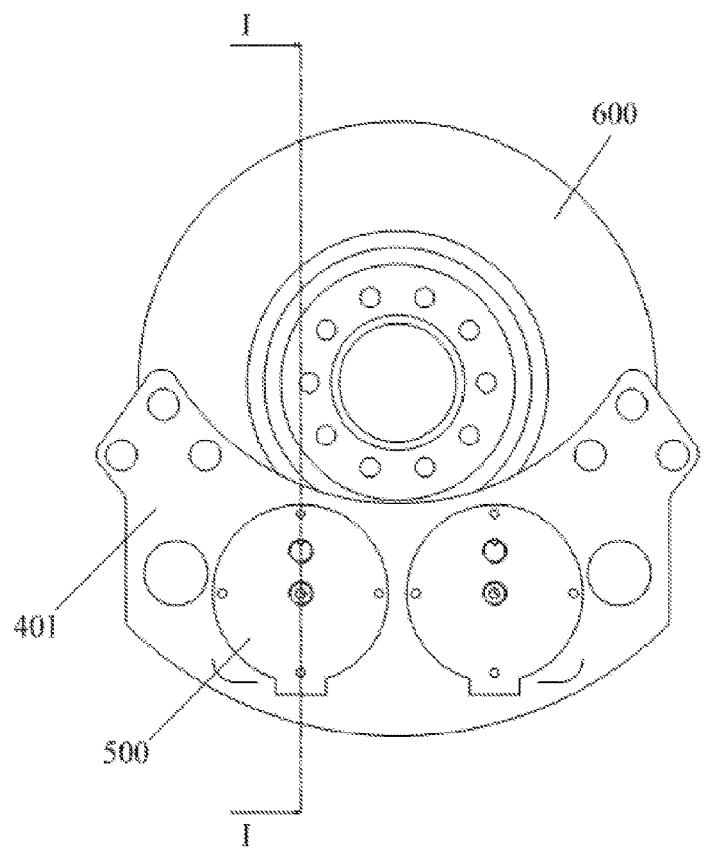
Fig. 15a

HYDRAULIC ANTI-LOCK BRAKE WHEEL CYLINDER AND AXLE BRAKING SYSTEM

CROSS-REFERENCE TO RELATED APPLICATIONS

This application is a 371 National Stage of International Application No. PCT/CN2015/079336, filed May 20, 2015, and claims the benefit of and priority to CN 201410213110.6, filed May 20, 2014. The entire disclosures of each of the above applications are incorporated herein by reference.

TECHNICAL FIELD

The invention relates to the field of a brake control system, in particular to a hydraulic anti-lock brake wheel cylinder and a braking system.

BACKGROUND OF THE INVENTION

As the number of motor vehicles increases, people have increasingly high requirement on safe traveling, and braking performance is an important basis of driving safety. Especially in the case of fast speed and large self weight of a motor vehicle, braking inertia affects safely driving more and more, so that it is a problem that all people in the motor vehicle industry try to solve sedulously as for how to reduce and optimize influence of braking inertia on the motor vehicle.

Currently, the existing axles in the market include gas-braked, hydraulic-braked and oil-gas mixing braked, all of which can realize braking to decelerate or stop a vehicle, but which have the following disadvantages: they occupy large space, are difficult to arrange and have bad braking performance, and the existing gas-braked drum axle cannot realize parking braking of a steering axle, and for a disc-type hydraulic-braked axle, traveling braking and parking braking are two separate systems, which have complex structure, produce not good effect, require high cost and applies inconvenient operation and the like.

Currently, the existing anti-lock brake system (ABS) in the market can also reduce and optimize influence of braking inertia on the motor vehicle, but it is impossible to large-scale popularize the existing ABS due to complex structure, low safety factor and high cost of the exsiting ABS.

SUMMARY OF THE INVENTION

Purpose of the present invention is to provide a hydraulic anti-lock brake wheel cylinder and a braking system, which can realize traveling parking and parking braking and also can realize anti-lock. To achieve the above purpose, the present invention adopts the following technical solutions:

The present invention provides a hydraulic anti-lock brake wheel cylinder, comprising: a cylinder body, a core tube, a first piston, a second piston, a first spring, a second spring and an end cover; wherein, the cylinder body is provided with a first cavity, a first oil chamber interface, a second oil chamber interface and an oil drainage interface, the end cover being disposed at an opening end of the first cavity;

the first piston is disposed in the first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;

the first piston is provided with a second cavity in which the second piston is positioned, and a second oil chamber is formed between the second piston and a top of the second cavity, the second spring is disposed between a bottom of the second piston and a bottom of the second cavity;

one end of the core tube is connected to a hand brake valve, and the other end thereof passes through the second oil chamber interface and is communicated with the second oil chamber, and the amount of oil flowing from the core tube into the second oil chamber is controlled by the hand brake valve;

the oil drainage interface is communicated with the first oil chamber when the pressure of the first oil chamber increases and pushes the first piston to move outwardly to a set position.

Preferably, the cylinder body includes one first cavity, two first cavities or three or more first cavities, and the first piston, the second piston, the first spring, the second spring and the end cover have the same number as the first cavity of the cylinder body; when the number of the first cavity is in plural, the number of the first oil chamber interface is in plural as well, each first oil chamber interface is correspondingly communicated with the first oil chamber, or one end of the first oil chamber interface that is communicated with the first oil chamber is divided into a plurality of branches, and each of the branches is correspondingly communicated with the first oil chamber; when the number of the first cavity is in plural, the number of the second oil chamber interface is in plural as well, each of the second oil chamber interfaces is correspondingly communicated with the second oil chamber, or one end of the second oil chamber interface that is communicated with the second oil chamber is divided into a plurality of branches, and each branch is correspondingly communicated with the core tube and the second oil chamber; when the number of the first cavity is in plural, the number of the oil drainage interface is in plural as well, each of the oil drainage interfaces is correspondingly communicated with an oil return pipeline, or one end of the oil drainage interface that is communicated with the first oil chamber is divided into a plurality of branches, and each branch is correspondingly communicated with the first oil chamber.

Preferably, the first cavities in the cylinder body are arranged in the same direction, arranged in opposite directions, arranged to face each other, arranged in double rows or in a single row, arranged in multiple directions.

Preferably, the first piston is provided with a first through hole through which the core tube passes, the second piston is provided with a second through hole through which the core tube passes and a second oil chamber inlet passage, the second oil chamber inlet passage is communicated with the second through hole and the second oil chamber, respectively; the core tube is into-connected via the second oil chamber interface, and passes through the first through hole of the first piston, the second through hole of the second piston and the second oil chamber inlet passage to allow hydraulic oil to flow into and out of the second oil chamber.

Preferably, the first piston includes a first piston body and a first piston rod that are disposed separately, a sealing device is disposed on an outer wall of the first piston body; the first piston body is provided with two side faces which are disposed to be opposite to each other, one side face that abuts the bottom of the first cavity is a first side face, the other side face is a second side face, the first side face is provided with a first through hole through which the core tube passes, a sealing device is disposed at the first through hole; the first piston rod includes a sleeve and a fixing part that extends along an edge of the sleeve, the fixing part is fixedly connected with the first piston body; the first piston body is provided therein with the second cavity, and the second cavity consists of a housing space that extends vertically to the second side face in the first piston body and the sleeve.

Preferably, the first piston includes a first piston press cover, a first piston rod that are disposed separately and a sealing screw that is fixedly connected on the first piston press cover; wherein, the first piston press cover includes a first cover plate, a first annular wall that extends outwardly from one side of the first cover plate is formed to be perpendicular to the first cover plate; the first cover plate is further provided with a first through hole that runs through the first cover plate at a center thereof, the sealing screw is provided with a through hole at a center thereof, and an outer wall of the sealing screw is fixedly connected with an inner wall of the first through hole, and the inner wall of the sealing screw is provided with a sealing slot for housing a sealing device:

the first piston rod includes a first sleeve and a fixing part that is formed by extending from one end of the first sleeve, the fixing part is sleeved on the first annular wall and is fixedly connected with the first annular wall; a top end of the fixing part, an outer wall of the first annular wall and the cover plate are enclosed to form a sealing slot for housing a sealing device; the first cover plate, an inner wall of the first annular wall, an inner wall of the fixing part and an inner wall of the sleeve are enclosed to form the second cavity for housing the second piston.

Preferably, the second piston is provided with a second piston body and a second piston rod, and the second piston body is housed in the first piston body, the second piston rod is housed in the sleeve of the first piston rod, an outer wall of the second piston body is provided with a sealing device; the second piston body is provided with the second through hole through which the core tube passes and the second oil chamber inlet passage, the second through hole is communicated with the second oil chamber inlet passage, and a sealing device is disposed at the second through hole.

Preferably, the second piston includes a second piston press cover and a second piston body that are disposed separately; wherein, the second piston press cover includes a second cover plate, a boss that extends outwardly from one side of the second cover plate is formed to be perpendicular to the second cover plate; the second cover plate is provided with a second through hole that runs through the second cover plate and the boss at a center thereof; the second through hole is provided with a sealing slot for housing a sealing device at the circumference thereof;

the second piston body includes a third cover plate, the third cover plate has two opposite sides, a second piston rod that extends perpendicularly to the third cover plate outwardly is formed on one side of the third cover plate, and a second annular wall that extends perpendicularly to the third cover plate outwardly is formed on the other side of the third cover plate; the second annular wall is sleeved on the boss and is fixedly connected with the boss; the second cover plate, an outer wall of the second annular wall and the third cover plate are enclosed to form a sealing slot for housing a sealing device; the third cover plate is provided with the second oil chamber inlet passage at a center thereof, and the second oil chamber inlet passage is communicated with the second through hole.

Preferably, a press cover is further included, the press cover is positioned at an inner side of the end cover, and the press cover abuts an inner wall of the cylinder body, and a sealing device is disposed between the press cover and the inner wall of the cylinder body, the first spring is disposed between the first piston and the press cover.

Preferably, the first spring and/or the second spring are/is a bellevill spring.

The present invention further provides an axle braking system including the above-described hydraulic anti-lock brake wheel cylinder, the braking system further includes an oil tank, an oil pump, a foot control valve, a hand control valve, a pipeline, a brake shoe, a brake drum and a hydraulic anti-lock brake wheel cylinder;

wherein, the oil tank is filled with hydraulic oil which flows through the oil pump and the pipeline into the hydraulic anti-lock brake wheel cylinder, the brake shoe is positioned at an inner side of the brake drum, and the brake shoe abuts or is separated from the brake drum by being driven by the hydraulic anti-lock brake wheel cylinder;

the hydraulic anti-lock brake wheel cylinder comprises: a cylinder body, a core tube, a first piston, a second piston, a first spring, a second spring and an end cover; wherein, the cylinder body is provided with a first cavity, a first oil chamber interface, a second oil chamber interface and an oil drainage interface, the end cover being disposed at an opening end of the first cavity;

the first piston is disposed in the first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;

the first piston is provided with a second cavity in which the second piston is positioned, and a second oil chamber is formed between the second piston and a top of the second cavity, the second spring is disposed between a bottom of the second piston and a bottom of the second cavity:

one end of the core tube is connected to a hand brake valve, and the other end thereof passes through the second oil chamber interface and is communicated with the second oil chamber, and the amount of oil flowing from the core tube into the second oil chamber is controlled by the hand brake valve;

the oil drainage interface is communicated with the first oil chamber when the pressure of the first oil chamber increases and pushes the first piston to move outwardly to a set position.

The present invention further provides an axle braking system which is applied to a braking system of a disc-type braking axle;

the braking system includes: a hydraulic anti-lock brake wheel cylinder fixing seat and a hydraulic anti-lock brake wheel cylinder, a brake pad, a brake rubber-block and a brake disc; two side walls of the fixing seat are provided with the brake pad and a guide block of a brake block consisting of the brake pad; the fixing seat has two side walls that are disposed to be opposite to each other, and a housing cavity for housing the brake disc is formed between the two side walls; the two side walls of the fixing seat are provided with more than one housing holes that run through the side walls from an outer side to an inner side, and the housing holes are step holes and include a first housing hole with a large hole diameter, a second housing hole with a small hole diameter and a step portion connecting the first housing hole and the second housing hole, the housing holes are used for housing the hydraulic anti-lock brake cylinder;

the hydraulic anti-lock brake wheel cylinder comprises: a cylinder body, a core tube, a first piston, a second piston, a first spring and a second spring; wherein, the cylinder body is provided with a first cavity, a first oil chamber interface, a second oil chamber interface and an oil drainage interface; an inner wall of the first housing hole is fixedly connected with an outer wall of the cylinder body so as to seal the first cavity:

the first piston is disposed in the first cavity, and the first spring is disposed between the first piston and the step portion, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;

the first piston is provided with a second cavity in which one end of the second piston is positioned, and a second oil chamber is formed between one end of the second piston and a top of the second cavity, the second spring is further disposed between a bottom of the second piston and a bottom of the second cavity; the other end of the second piston passes through the first housing hole and protrudes into the housing cavity to be connected with the brake pad, the brake pad is fixedly connected with the brake rubber-block:

one end of the core tube is connected to a hand brake valve, and the other end thereof passes through the second oil chamber interface and is communicated with the second oil chamber, and the amount of oil flowing from the core tube into the second oil chamber is controlled by the hand brake valve;

the oil drainage interface is communicated with the first oil chamber when the pressure of the first oil chamber increases and pushes the first piston to move outwardly to a set position;

or, the braking system includes: a hydraulic anti-lock brake wheel cylinder fixing seat and a hydraulic anti-lock brake wheel cylinder, a brake pad, a brake rubber-block and a brake disc; two side walls of the fixing seat are provided with the brake pad and a guide block of a brake block consisting of the brake rubber-block; the fixing seat has two side walls that are disposed to be opposite to each other, and a housing cavity for housing the brake disc is formed between the two side walls; the two side walls of the fixing seat can also be provided with more than one first cavity extending from an inner side to an outer side; the first oil chamber interface, the second oil chamber interface and the oil drainage interface are disposed at the outer side of the side walls:

the hydraulic anti-lock brake wheel cylinder comprises: a core tube, a first piston, a second piston, a first spring, a second spring and an end cover; wherein, the end cover is fixedly connected with an opening end of the first cavity;

the first piston is disposed in the first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;

the first piston is provided with a second cavity in which the second piston is positioned, and a second oil chamber is formed between the second piston and a top of the second cavity, the second spring is disposed between a bottom of the second piston and a bottom of the second cavity;

one end of the core tube is connected to a hand brake valve, and the other end thereof passes through the second oil chamber interface and is communicated with the second oil chamber, and the amount of oil flowing from the core tube into the second oil chamber is controlled by the hand brake valve;

the oil drainage interface is communicated with the first oil chamber when the pressure of the first oil chamber increases and pushes the first piston to move outwardly to a set position.

Preferably, the two side walls of the fixing seat can be provided separately, and the bottom of the two side walls are fixedly connected when the two side walls are provided separately, so as to form a housing cavity between the two side walls.

By adopting the hydraulic anti-lock brake wheel cylinder of the present invention, when the hydraulic oil flows from the oil tank through the oil pump, the pipeline, the first oil chamber interface and the second oil chamber interface of the cylinder body into the installed and the debugged hydraulic anti-lock traveling brake wheel cylinder:

① when the hand brake valve and the foot brake valve are both closed, the first piston adjoins the bottom of the first hole of the cylinder body under the pressure of the first spring, and the second piston extends outwardly under the pressure of the second spring, such that the brake shoe or the brake block and the brake drum or the brake disc are in closed connection state, and thus the vehicle is in the parking braking state.

② when the parking braking needs to be released, the hydraulic oil is controlled by the hand brake valve to flow through the second oil chamber interface and the core tube into the second oil chamber, the second piston oppresses the second spring to run to the bottom of the second cavity, to drive the brake shoe or the brake block to be separated from the brake drum or the brake disc, so as to release the parking braking of the vehicle, thus the vehicle can travel.

③ when the vehicle needs to be braked in the traveling, the foot brake valve is manipulated such that the hydraulic oil flows through the first oil chamber interface into the first oil chamber, at this time the hydraulic oil in the first oil chamber oppresses the first piston which oppresses the first spring to elastically extend outwardly, such that the brake shoe or the brake block is pressed tightly against the brake drum or the brake disc to achieve the purpose of braking; the larger the pressure of the hydraulic oil in the first oil chamber is, the more the first piston is oppressed to extend outwardly, and the larger the brake force is.

④ when the foot brake valve reduces the pressure of the hydraulic oil in the first oil chamber, the elastic force of the first spring is released, thereby pushing the first piston to retract and driving the brake shoe or the brake block to depart from the brake drum or the brake disc, to achieve the purpose of alleviating or relieving the braking.

⑤ when the foot brake valve continuously increases the first oil chamber pressure, the first piston is continuously oppressed, and the first piston oppresses the first spring, and the first piston and the second piston both extend outwardly. The first oil chamber is communicated with the oil drainage interface when the first piston runs to a predetermined position (i.e., a maximum brake force). The high-pressure oil flows back to the oil tank via the oil drainage interface, thus the pressure of the oil chamber is reduced. When the pressure of the first oil chamber is lower than the elastic force of the first spring, the first spring compresses the first piston to be retracted to close off the oil drainage interface, then the first oil chamber is again communicated with the oil drainage interface when the pressure of the first oil chamber increases continuously and pushes the piston to run to the predetermined position again, in such reciprocation, the brake shoe or the brake block is driven to be separated from and combined with the brake drum or the brake disc constantly, so as to achieve the purpose of braking and anti-lock.

BRIEF DESCRIPTION OF THE DRAWINGS

FIG. 14a is a structural schematic of an embodiment of a brake wheel cylinder, a brake shoe and a brake drum in a braking system according to the present invention;

FIG. 14b is a structural schematic of another embodiment of a brake wheel cylinder, a brake shoe and a brake drum in a braking system according to the present invention;

FIG. 15a is a structural schematic of an embodiment of a disc-type braking system according to the present invention;

FIG. 15b is a sectional structural schematic taken along a line I-I in FIG. 2a.

DETAILED DESCRIPTION OF THE EMBODIMENT

Hereinafter, the present invention will be further described in detail incorporating accompanying drawings.

Figure 1:
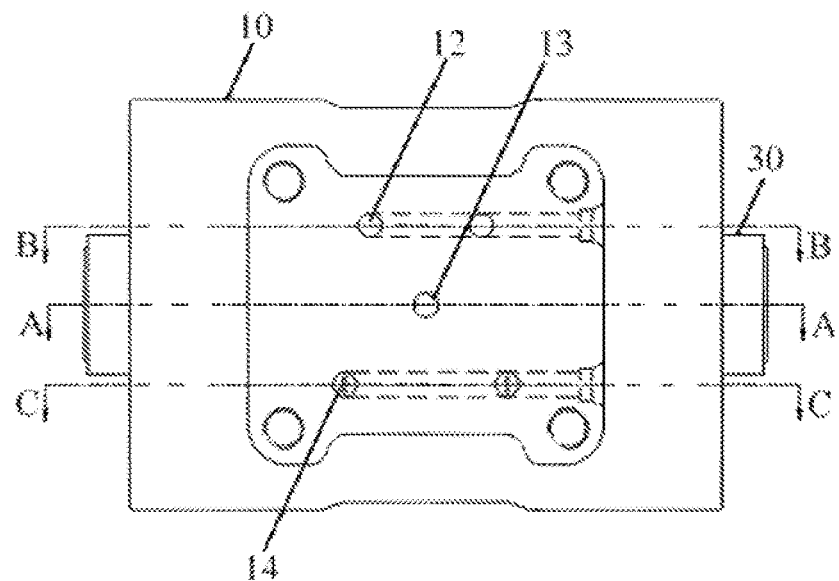
FIG. 1 is a top view structural schematic of a hydraulic anti-lock brake wheel cylinder according to the present invention.
Figure 2:
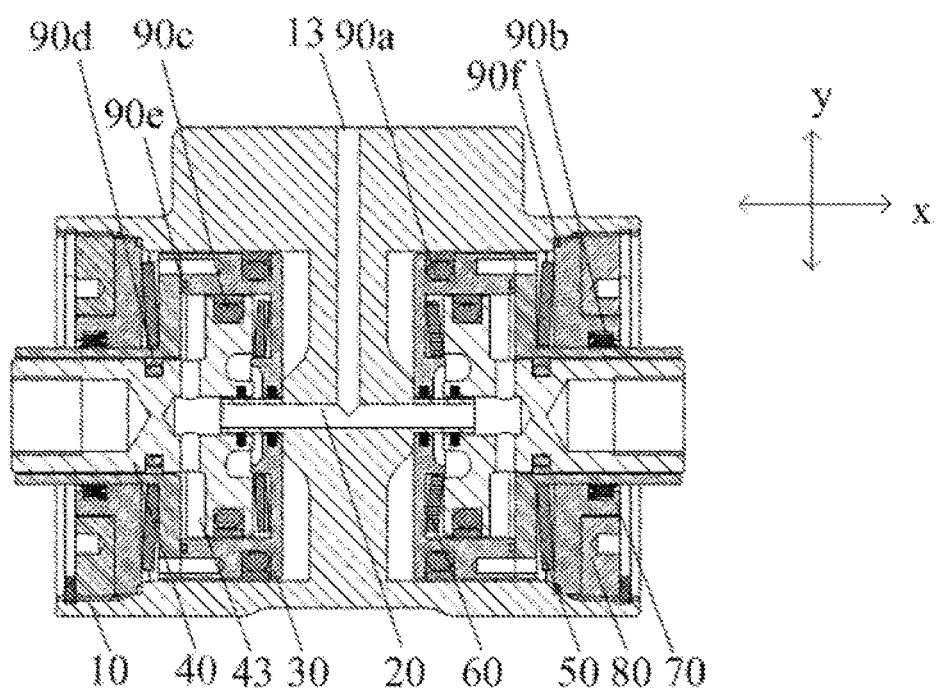
FIG. 2 is a sectional structural schematic of the hydraulic anti-lock brake wheel cylinder taken along a line A-A in FIG. 1.

As shown in FIGS. 1 and 2. FIG. 1 is a top view structural schematic of a hydraulic anti-lock brake wheel cylinder according to the present invention and FIG. 2 is a sectional structural schematic of a first embodiment of the hydraulic anti-lock brake wheel cylinder taken along a line A-A in FIG. 1. For the convenience of the following structural description, here in FIG. 2 it is defined that a negative direction of an x-axis is top, and a positive direction of the x-axis is bottom. The hydraulic anti-lock brake wheel cylinder comprises: a cylinder body 10, a core tube 20, a first piston 30, a second piston 40, a first spring 50, a second spring 60 and an end cover 70. The first piston 30 is housed in the cylinder body 10, and the first piston 30 moves along the x-axis direction in FIG. 2 relative to the cylinder body 10. The second piston 40 is housed in the first piston 30, and the second piston 40 moves along the x-axis direction in FIG. 3 relative to the first piston 30. The end cover 70 is disposed at an outer end of the cylinder body 10 and is fixedly connected with an inner wall of the cylinder body 10, which can limit the movement stroke of the first piston 30 and the second piston 40. A press cover 80 is positioned at an inner side of the end cover 70, and the press cover 80 abuts the inner wall of the cylinder body 10, and a sealing device 90f is disposed between the press cover 80 and the inner wall of the cylinder body 10. The first spring 50 is disposed between the first piston 30 and the press cover 80, and the second spring 60 is disposed between a bottom of a second cavity 34 and a bottom of the second piston 40. It can be understood that the above-described hydraulic anti-lock brake wheel cylinder also may not have the press cover 80, but is fixedly connected with the cylinder body 10 by the end cover 70, so as to seal the first cavity.

Figure 3:
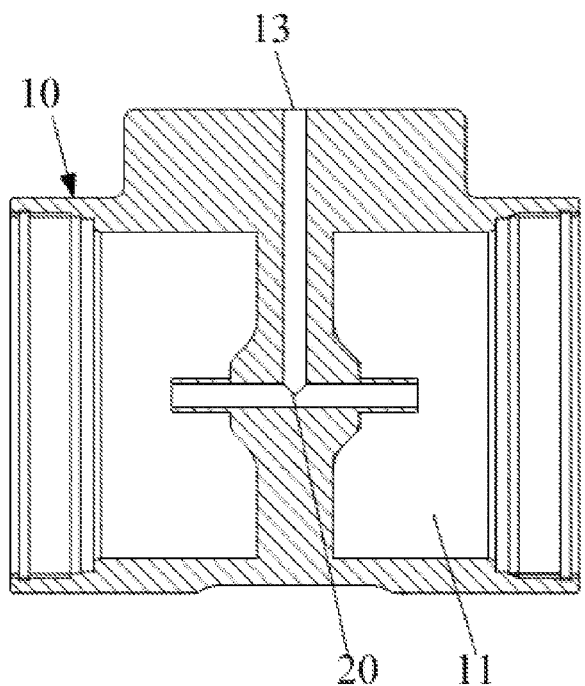
FIG. 3 is a sectional structural schematic of a cylinder body of the hydraulic anti-lock brake wheel cylinder taken along a line A-A in FIG. 1.
Figure 4:
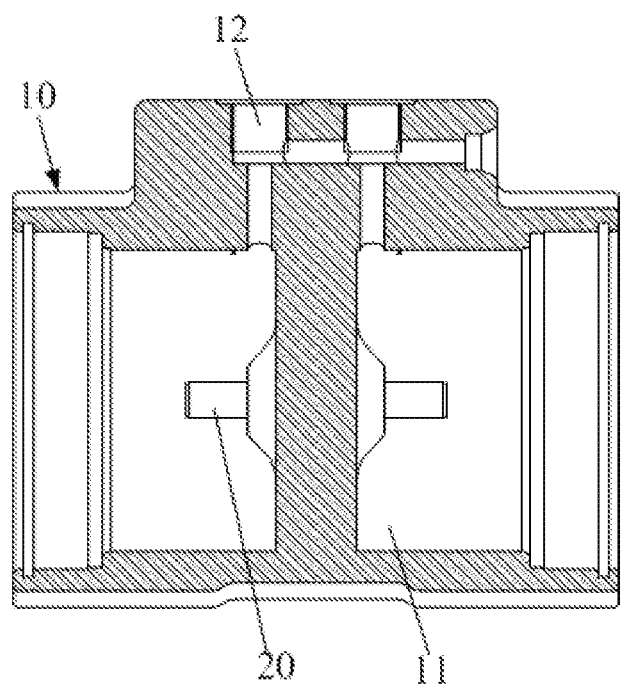
FIG. 4 is a sectional structural schematic of a cylinder body of the hydraulic anti-lock brake wheel cylinder taken along a line B-B in FIG. 1.
Figure 5:
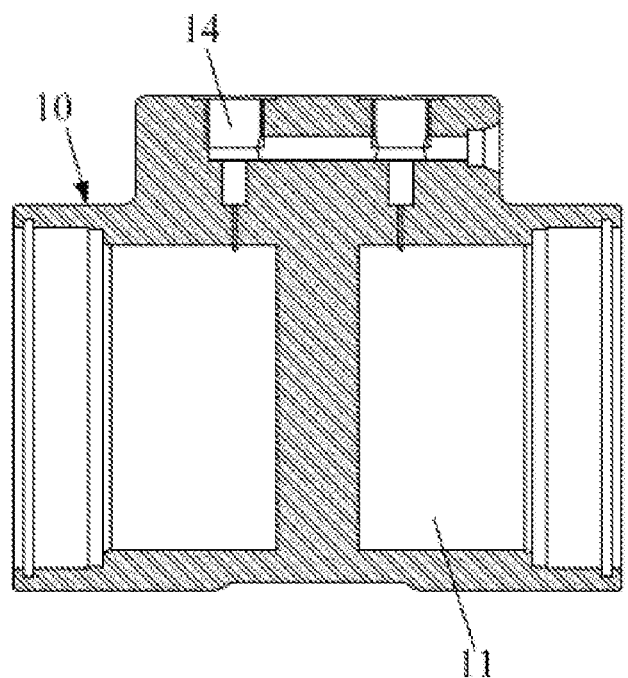
FIG. 5 is a sectional structural schematic of a cylinder body of the hydraulic anti-lock brake wheel cylinder taken along a line C-C in FIG. 1.

As shown in FIGS. 3-5, the cylinder body 10 is provided with a first cavity 11, a first oil chamber interface 12, a second oil chamber interface 13 and an oil drainage interface 14. In the embodiment, the cylinder body 10 is provided with two first cavities 11 and the two first cavities 11 are symmetrically disposed. Certainly, the cylinder body of the hydraulic anti-lock brake wheel cylinder may also be provided with only one first cavity, or more than three first cavities. Correspondingly, the first piston 30, the second piston 40, the first spring 50, the second spring 60 and the end cover 70 have the same number as the first cavities 11 disposed in the cylinder body 10 and the second cavities disposed in the first piston 30. When the number of the first cavities 11 is in plural, the number of the first oil chamber interface 12 is also in plural. Each first oil chamber interface 12 is correspondingly communicated with the first oil chamber, or one end of the first oil chamber interface 12 that is communicated with the first oil chamber is divided into a plurality of branches, and each of the branches is correspondingly communicated with the first oil chamber. When the number of the first cavity 11 is in plural, the second oil chamber interfaces 13 are in plural as well. Each of the second oil chamber interfaces 13 is correspondingly communicated with the second oil chamber, or one end of the second oil chamber interface 13 that is communicated with the second oil chamber is divided into a plurality of branches, and each branch is correspondingly communicated with the core tube and the second oil chamber. When the number of the first cavity is in plural, the oil drainage interfaces 14 are also in plural. Each of the oil drainage interfaces 14 is correspondingly communicated with an oil return pipeline, or one end of the oil drainage interface 14 that is communicated with the first oil chamber is divided into a plurality of branches, and each branch is correspondingly communicated with the first oil chamber.

The first cavities 11 of the cylinder body 10 can be arranged in the same direction, arranged in opposite directions, arranged to face each other, arranged in double rows or in a single row, arranged in multiple directions.

Figure 6:
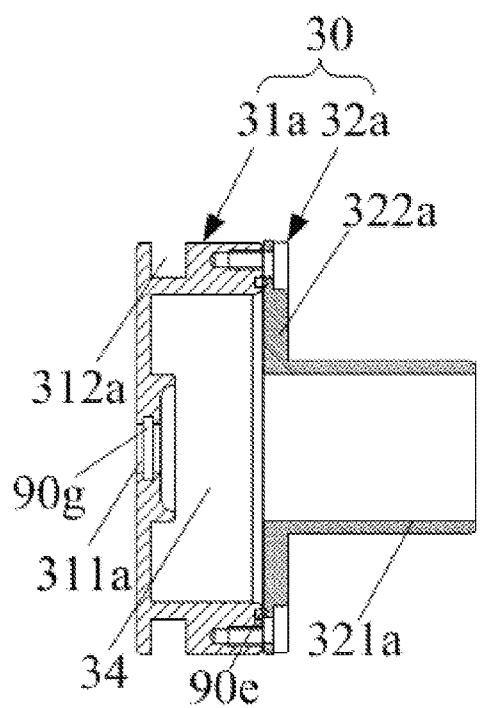
FIG. 6 is a structural schematic of a first embodiment of a first piston of the hydraulic anti-lock brake wheel cylinder according to the present invention.
Figure 7:
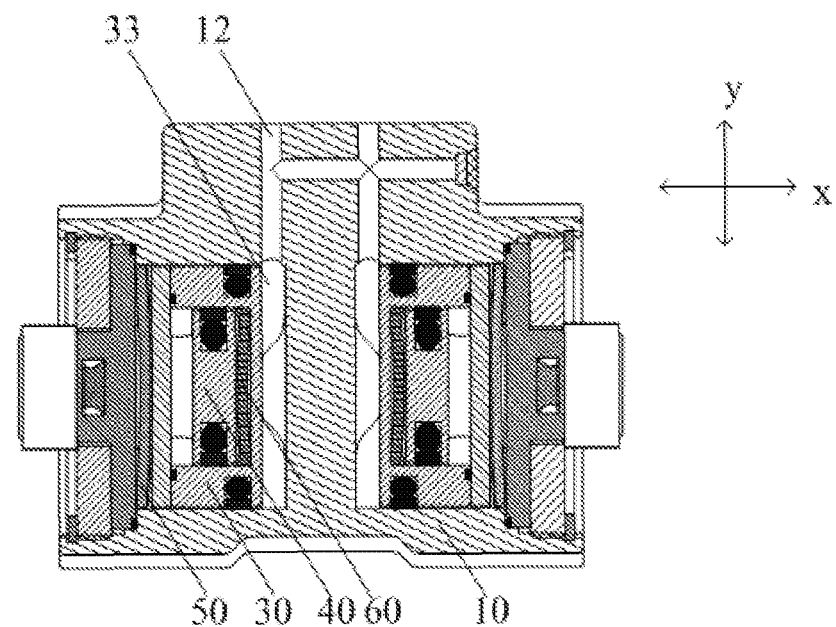
FIG. 7 is a sectional structural schematic of the hydraulic anti-lock brake wheel cylinder taken along a line B-B in FIG. 1.

As shown in FIGS. 6 and 7, it is provided with a structure of a first embodiment of the first piston 30 according to the present invention. In the embodiment, the first piston 30 is disposed in the first cavity 11 of the cylinder body 10 and includes a first piston body 31a and a first piston rod 32a that are disposed separately. The first piston body 31a has two side faces that are disposed to opposite to each other, and one side face that abuts the bottom of the first cavity 11 is a first side face, and the other side face is a second side face. The first side face is provided with a first through hole 311a that runs through the first side face. The space that is formed between the top of the first cavity 11 and the first side face of the first piston body 31a is a first oil chamber 33. An inner diameter of the first cavity 11 is basically equal to an outer diameter of the first piston body 31a. One end at the first oil chamber interface 11 of the cylinder body 10 is communicated with the first oil chamber, and the other end is connected to a foot brake valve (not shown). An outer side wall of the first piston body 31a is provided with a sealing slot 312a for housing a sealing device 90a (as shown in FIG. 2). The sealing device 90a prevents a leakage of the hydraulic oil in the first oil chamber 33 when the first piston body 31a slides in the first cavity 11. The first through hole 311a is also provided therein with a sealing device 90g for preventing a leakage of the hydraulic oil. Meanwhile, a sealing device 90e is provided at a position where the first piston body 31a is connected with the first piston rod 32a, so as to prevent a leakage of the hydraulic oil in the second oil chamber. The first piston rod 32a includes a first sleeve 321a and a fixing part 322a that extends along an edge of the first sleeve 321a, and the fixing part 322a is fixedly connected with the second side face of the first piston body 31a by a screw. The first piston 30 is provided with a second cavity 34 for housing the second piston 40, and the second cavity 34 consists of a housing space on the first piston body 31a and the first sleeve 321a of the first piston rod 32a. As shown in FIG. 5, the hydraulic oil in the oil tank can be inputted into the first oil chamber 33 via the first oil chamber interface 12, and by controlling the foot brake valve, an amount of the hydraulic oil inputted into the first oil chamber 33 can be controlled.

Figure 8:
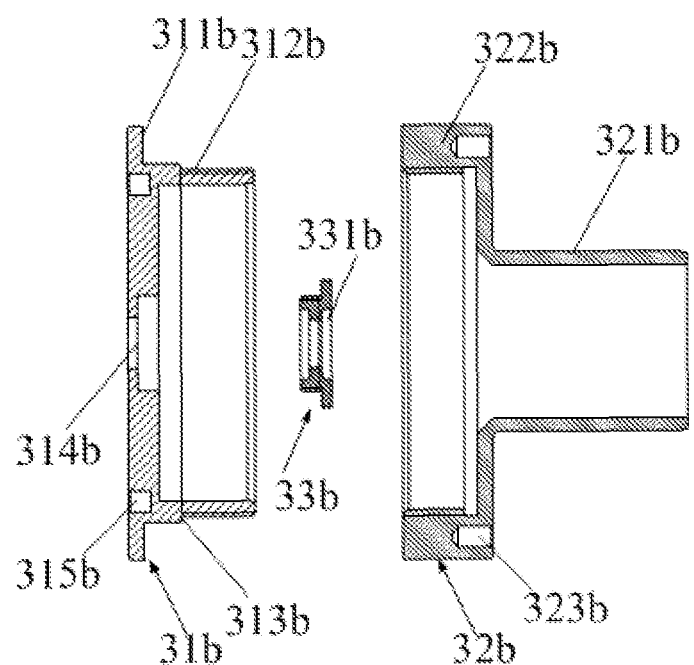
FIG. 8 is an exploded structural schematic of a second embodiment of the first piston of the hydraulic anti-lock brake wheel cylinder according to the present invention.
Figure 9:
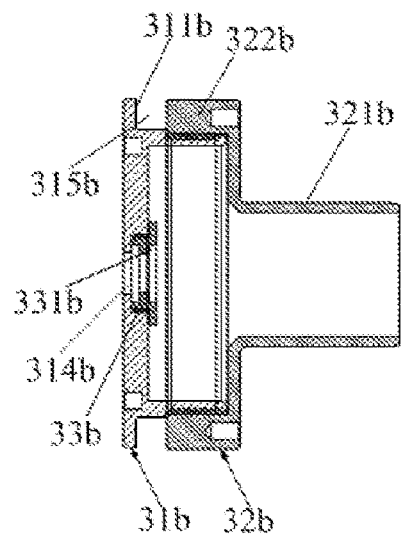
FIG. 9 is a combined structural schematic of the second embodiment of the first piston of the hydraulic anti-lock brake wheel cylinder according to the present invention.

As shown in FIGS. 8 and 9, it is provided with a structure of a second embodiment of the first piston. In the embodiment, the first piston 30 includes a first piston press cover 31b and a first piston rod 32b that are disposed separately and a sealing screw 33b that is fixedly connected on the first piston press cover 31b. The first piston press cover 31b includes a first cover plate 311b, and a first annular wall 312b that extends perpendicularly to the first cover plate 311b outwardly is formed on one side of the first cover plate 311b. An outer wall of the first annular wall 312b is provided with a stopping part 313b. The first cover plate 311b is further provided with a first through hole 314b that runs through the first cover plate 311b at a center thereof. The sealing screw 33b is provided with a through hole at a center thereof, and an outer wall of the sealing screw 33b is in thread connection with an inner wall of the first through hole 314b, and a sealing slot 331b for housing a sealing device is disposed on the circumference of an inner wall of the sealing screw 33b. The first piston rod 32b includes a first sleeve 321b and a fixing part 322b that is formed by extending from one end of the first sleeve 321b. An inner diameter of the fixing part 322b is larger than that of the first sleeve 321b, and an inner diameter of the fixing part 322b is slightly larger than that of the first annular wall 312b. The fixing part 322b is sleeved on the first annular wall 312b and is fixedly connected with the first annular wall 312b. To be specific, the first annular wall 312b is provided with an outer thread structure and the fixing part 322b is provided with an inner thread structure, such that the first annular wall 312b and the fixing part 322b form a sealed thread connection. A top end of the fixing part 322b abuts against the stopping part 313b of the first annular wall 312b, such that the top end of the fixing part 322b, the outer wall of the first annular wall 312b and the cover plate 311b are enclosed to form a sealing slot 315b. The sealing slot 315b is used for housing the sealing device 90a (as shown in FIG. 2). The first cover plate 311b, the inner wall of the first annular wall 312b, the inner wall of the fixing part 322b and the inner wall of the first sleeve 321b are enclosed to form the second cavity for housing the second piston 40.

Further, for the convenience of the thread connection between the first piston press cover 31b and the first piston rod 32b, the first piston press cover 31b and the first piston rod 32b are provided with an assembly auxiliary structure 315b and 323b, respectively. When assembling, an assistive tool (such as a locking device) is positioned on the assembly auxiliary structures of the first piston press cover 31b and the first piston rod 32b, and then is screwed up, so as to fix the first piston press cover 31b and the first piston rod 32b.

Figure 10:
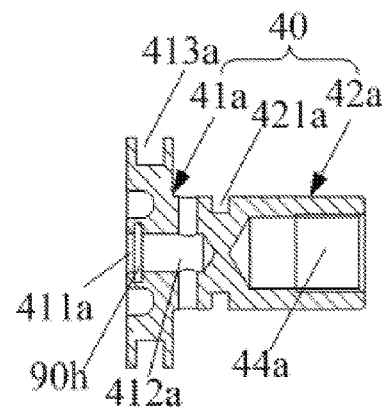
FIG. 10 is a structural schematic of a first embodiment of a second piston of the hydraulic anti-lock brake wheel cylinder according to the present invention.

As shown in FIGS. 10, 2 and 4, it is provided with a structure of a first embodiment of the second piston according to the present invention. In the embodiment, the second piston 40 is disposed in the second cavity 34 of the first piston 30a. The second piston 40 is provided with a second piston body 41a and a second piston rod 42a that are integrally disposed. The second piston body 41a is housed in a housing space of the first piston body 31a, and the second piston rod 42a is housed in the sleeve 321a of the first piston rod 32a. A space that is formed by a top of the second piston body 41a of the second piston 40 and a top of the second cavity 34a is a second oil chamber 43a. The second piston body 41 is provided with a second through hole 411a through which the core tube passes and a second oil chamber inlet passage 412a. The second through hole 411a is communicated with the second oil chamber inlet passage 412a, and the second oil chamber inlet passage 412a is communicated with the second oil chamber 43a. The second piston rod 42a is provided therein with a connection device 44a connected to the brake shoe 300. In addition, the outer wall of the second piston body 41a is provided with a sealing slot 413a for housing a sealing device 90c (as shown in FIG. 2), and the outer wall of the second piston rod 42a is also provided with a sealing slot 421a for housing a sealing device 90d. The sealing device 90c prevents a leakage of the hydraulic oil in the first oil chamber 33 when the second piston 40 slides in the second cavity 34 of the first piston 30. The sealing device 90d prevents a leakage of the hydraulic oil in the second oil chamber 43 when the second piston 40 slides in the second cavity 34 of the first piston 30. A sealing slot for housing a sealing device 90h is disposed on the circumference of the second through hole 411a.

The core tube 20 is disposed in the cylinder body 10, and one end of the core tube 20 passes through one or more of the second oil chamber interface 13, the first through hole 311a of the first piston 30 and the second oil chamber inlet passage 412a of the second piston 40 to be communicated with the second oil chamber 43, and the other end is connected to a hand brake valve (not shown) via the second oil chamber interface 13. By controlling the hand brake valve, the hydraulic oil can be inputted into the core tube, and then inputted into the second oil chamber 43 by the core tube 20. If the number of the second oil chamber 43 is in plural, one end of the core tube 20 that penetrates into the cylinder body 10 is divided into multiple branches which correspondingly input the hydraulic oil into the second oil chamber 43.

Further, a pressure limiting valve or a hydraulic electromagnetic valve can also be provided in the first oil chamber or on a pipeline in communication with the first oil chamber. When the pressure of the first oil chamber reaches a set value, the pressure limiting valve or the hydraulic electromagnetic valve releases the hydraulic oil in the first oil chamber. The released hydraulic oil flows through the oil drainage interface or an oil return pipeline into the oil tank, then the pressure of the hydraulic oil in the first oil chamber is reduced, the pressure limiting valve or the hydraulic electromagnetic valve closes the first oil chamber, and the pressure of the hydraulic oil in the first oil chamber can rise again based on the operation, and in such reciprocation, the purpose of anti-lock can be achieved.

Figure 11:
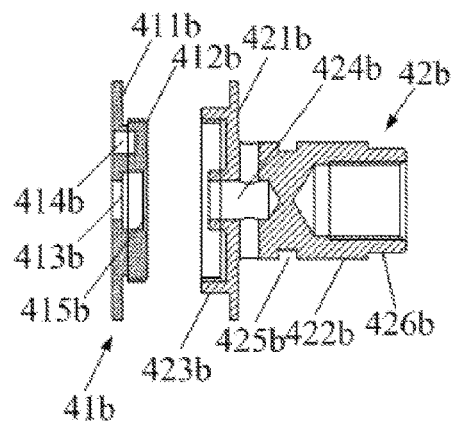
FIG. 11 is an exploded structural schematic of a second embodiment of the second piston of the hydraulic anti-lock brake wheel cylinder according to the present invention.
Figure 12:
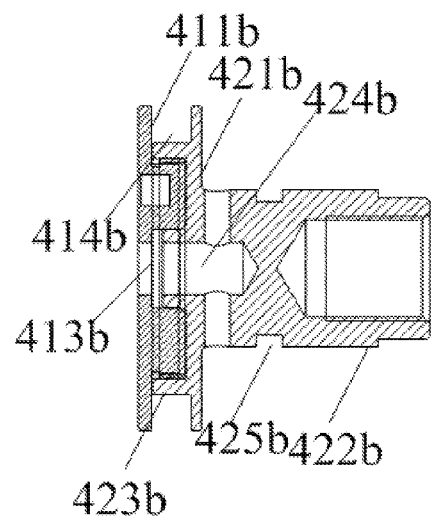
FIG. 12 is an exploded structural schematic of the second embodiment of the second piston of the hydraulic anti-lock brake wheel cylinder according to the present invention.

As shown in FIGS. 11 and 12, it is provided with a structure of a second embodiment of the second piston according to the present invention. In the embodiment, the second piston 40 includes a second piston press cover 41b and a second piston body 42b that are disposed separately. The second piston press cover 41b includes a second cover plate 411b, and a boss 412b that extends perpendicularly to the second cover plate 411b outwardly is formed on one side of the second cover plate 411b. The second cover plate 411b is further provided with a second through hole 413b that runs through the second cover plate 411b and the boss 412b at a center thereof. Also a sealing slot for housing the sealing device 90h is disposed on the circumference of an inner wall of the second through hole 413b. The second piston body 42b includes a third cover plate 421b, which has two opposite sides. A second piston rod 422b that extends perpendicularly to the third cover plate 421b outwardly is formed on one side of the third cover plate 421b, and a second annular wall 423b that extends perpendicularly to the third cover plate 421b outwardly is formed on the other side of the third cover plate 421b. The second annular wall 423b is sleeved on the boss 412b, and the second annular wall 423b is fixedly connected with the boss 412b. To be specific, the second annular wall 423b is provided with an inner thread structure, and the boss 412b is provided with an outer thread structure, such that the second annular wall 423b and the boss 412b form a sealed thread connection. The second cover plate 411b, the outer wall of the second annular wall 423b and the third cover plate 421b are enclosed to form a sealing slot 414b for housing the sealing device 90c. The third cover plate 421b is provided with a second oil chamber inlet passage 424b at a center thereof, and the second oil chamber inlet passage 424b is communicated with the second through hole 413b. A space that is formed by one side of the third cover plate 421b of the second piston 40 at which the second piston rod 422b is provided and the top of the second cavity is the second oil chamber.

Further, for the convenience of the thread connection between the second piston press cover 41b and the second piston body 42b, the second piston press cover 41b and the second piston body 42b are provided with an assembly auxiliary structure 414b and 426b, respectively. When assembling, an assistive tool (such as a locking device) is positioned on the assembly auxiliary structures of the second piston press cover 41b and the second piston body 42b, and then is screwed up, so as to fix the second piston press cover 41b and the second piston body 42b.

It can be understood that, as for the first piston 30 and the second piston 40 in the above embodiments, the second piston 40 in the first embodiment can be housed in the second cavity of the first piston 30 in the first embodiment, or the second piston 40 in the first embodiment can be housed in the second cavity of the first piston 30 in the second embodiment, the second piston 40 in the second embodiment can be housed in the second cavity of the first piston 30 in the first embodiment, or the second piston 40 in the second embodiment can be housed in the second cavity of the first piston 30 in the second embodiment.

Figure 13:
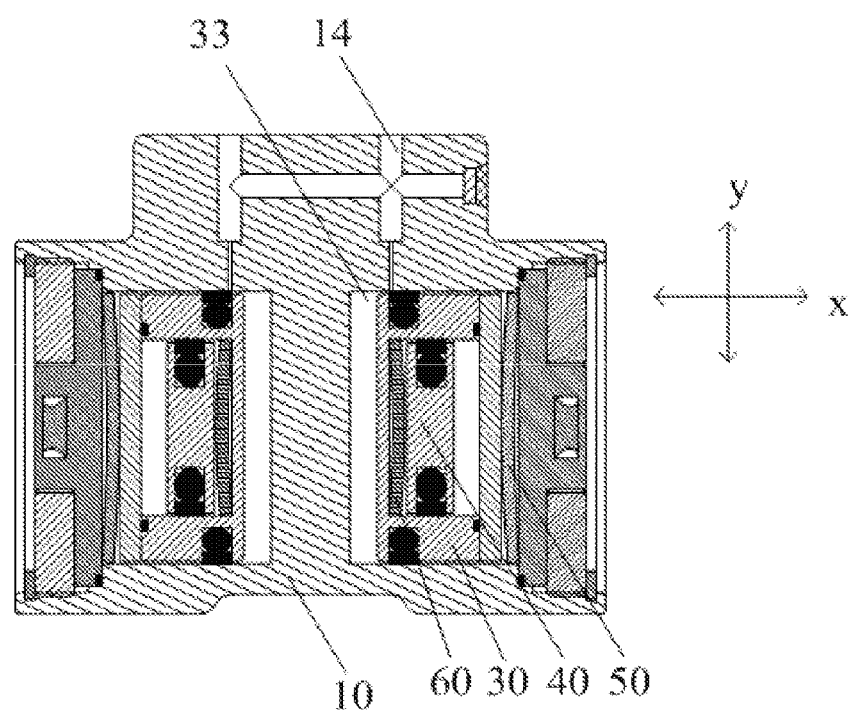
FIG. 13 is a sectional structural schematic of the hydraulic anti-lock brake wheel cylinder taken along a line C-C in FIG. 1.

As shown in FIGS. 13 and 5, the oil drainage interface 14 extends into the first cavity 11, and an oil drainage hole is formed at a position where the oil drainage interface 14 is communicated with the first cavity 11. The oil drainage hole of the oil drainage interface 14 can be positioned at a suitable position of the first cavity 11, such that in general condition, the first piston 30 positioned in the first cavity 11 blocks off the pipeline between the first oil chamber and the oil drainage interface 14, i.e., blocks off the oil drainage hole. When the pressure of the hydraulic oil that flows into the first oil chamber 33 via the first oil chamber interface 12 increases continuously, the pressure of the hydraulic oil pushes the first piston 30 to move along the positive direction of the x-axis to the predetermined position, and the oil drainage hole is exposed, so that the oil drainage interface 14 is communicated with the first oil chamber 33, and the hydraulic oil in the first oil chamber 33 can flow back to the oil tank via the oil drainage interface 14.

Taking the first piston 30 in the first embodiment and the second piston in the first embodiment as an example, the sealing device is a sealing ring. When installing the above-described hydraulic anti-lock brake wheel cylinder, firstly the sealing ring 90a is sleeved on the first piston body 31a of the first piston 30, and the first piston body 31a is housed in the first cavity 11 of the cylinder body 10. The sealing ring 90c is sleeved on the second piston body 41a of the second piston 40 and then the second piston body 41a is housed in the second cavity 34 of the first piston body 31a. The second spring 60 is disposed between the second piston body 41a and the bottom of the second cavity 34 of the first piton 30, and a sealing ring 90d is sleeved on the second piston rod 42a. Then the first piston rod 32a of the first piston 30 is sleeved on the second piston rod 42a of the second piston 40, and the fixing part 322 of the first piston rod 32 of the first piston 30 is fixedly connected with the second side face of the first piston body 31 by a screw. Then the press cover 80 presses the first piston rod 32, and the first spring 50 is disposed between the press cover 80 and the fixing part 322 of the first piston rod 32. Then the end cover 70 is installed at an outer end of the cylinder body 10 to seal the first cavity 11. Finally the sealing ring 90g is sleeved on the core tube 20, and the core tube 20 passes through one or more of the second oil chamber interface 13, the first through hole 311a of the first piston 30 and the second oil chamber inlet passage 412a of the second piston 40 to be communicated with the second oil chamber 43, and thus is installed in the cylinder body 10.

Taking the first piston 30 in the second embodiment and the second piston in the second embodiment as an example, the sealing device is a sealing ring. When installing the above-described hydraulic anti-lock brake wheel cylinder, firstly the first piston press cover 31b of the first piston 30 is housed in the first cavity 11 of the cylinder body 10, then the sealing screw 33b is fixed on the first piston press cover 31b, and the sealing ring 90g is disposed in the sealing slot 331b of the sealing screw 33b. Then the second piston press cover 41 of the second piston 40 is housed in the first annular wall 312b of the first piston 30, in which the second spring 60 is disposed between the second cover plate 411b and the bottom of the second cavity 11 of the first piston 30. Then after the sealing ring 90c is sleeved on the second annular wall 423b of the second piston rod 42b of the second piston 40, the second annular wall 423b is fixedly connected with the second piston press cover 41, and then after a sealing ring 90a is sleeved on the fixing part 322b of the first piston rod 32b of the first piston 30, the fixing part 322b is sleeved on the first annular wall 312b and is fixedly connected with the first piston press cover 41. Then the press cover 80 presses the first piston rod 32, and the first spring 50 is disposed between the press cover 80 and the fixing part 322 of the first piston rod 32. Then the end cover 70 is installed at an outer end of the cylinder body 10 to seal the first cavity 11. Finally, the core tube 20 passes through one or more of the second oil chamber interface 13, the first through hole 311a of the first piston 30 and the second oil chamber inlet passage 412a of the second piston 40 to be communicated with the second oil chamber 43, and thus is installed in the cylinder body 10.

Further, the above-described first spring 50 and/or the second spring 60 are/is a bellevill spring, and certainly can also be other elastic members that have the same function, and here is not limited.

It can be understood that, the above-described sealing devices are any objects or members that can play the role of sealing, and here are not limited. In the embodiment, the sealing device is preferably a sealing ring.

Further, the present invention further provides a braking system, which can be widely applied in a braking system of a driving axle and a driven axle, or can be widely applied in a drum-type brake axle and a disc-type brake axle, can realize traveling braking, parking braking and also can realize anti-lock, such that driving is more safe, arrangement is more simple, and operation is more convenient; the braking system is also applicable to a braking system of other devices such as a winch.

The present invention provides a structure of a first embodiment of a braking system. The braking system is a braking system of a drum-type brake axle, and can include: an oil tank, an oil pump, a foot control valve, a hand control valve, a pipeline, a brake shoe, a brake drum and a hydraulic anti-lock brake wheel cylinder and the like. The oil tank is filled with hydraulic oil, and the hydraulic oil in the oil tank flows through the oil pump and the pipeline into the hydraulic anti-lock brake wheel cylinder. Under the braking effect of the hydraulic anti-lock brake wheel cylinder, braking of the brake shoe and the brake drum can be achieved or released, so as to achieve the braking purpose and the anti-lock purpose. As shown in FIGS. 14a and 14b, the hydraulic anti-lock brake wheel cylinder 100 shown in FIG. 14a is provided with two first cavities that are disposed to be opposite to each other in the cylinder body. The hydraulic anti-lock brake wheel cylinder 100 shown in FIG. 14b is provided with one first cavity in the cylinder body, and the number of the hydraulic anti-lock brake wheel cylinder 100 is two. The brake shoe 300 is located at an inner side of the brake drum 200, and the brake shoe 300 is pushed by the hydraulic anti-lock brake wheel cylinder 100 to abut or be separated from the brake drum 200, so as to realize braking or release the braking.

In the braking system adopting the hydraulic anti-lock brake wheel cylinder with the above-described structure, when the hydraulic oil flows from the oil tank through the oil pump, the pipeline, the first oil chamber interface and the second oil chamber interface of the cylinder body into the installed and the debugged hydraulic anti-lock traveling brake wheel cylinder:

① when the hand brake valve and the foot brake valve are both closed, the first piston 30 adjoins the bottom of the first cavity 11 of the cylinder body 10 under the pressure of the first spring 50, and the second piston 40 extends outwardly under the pressure of the second spring 60, such that the brake shoe 300 and the brake drum 200 are in closed connection state, and thus the vehicle is in braking.

② as shown in FIG. 2, taking the movement process of the right-half structure of the cylinder body 10 in FIG. 2 as an example, under the control of the hand brake valve, the hydraulic oil flows into the cylinder body 10 via the second oil chamber interface 13, and flows into the second oil chamber 43 through the core tube in the cylinder body 10. As the pressure of the hydraulic oil in the second oil chamber 43 increases, the second piston 40 oppresses the second spring 60 to move along the negative direction of the x-axis so as to drive the brake shoe 300 and the brake drum 200 to be separated, thus parking braking of the vehicle is released, and the vehicle can travel.

③ as shown in FIG. 7, taking the movement process of the left-half structure of the cylinder body 10 in FIG. 7 as an example, in the traveling of the vehicle, under the control of the foot brake valve, the hydraulic oil flows into the first oil chamber 33 via the first oil chamber interface 12, at this time the hydraulic oil in the first oil chamber 33 oppresses the first piston 30, then the first piston 30 oppresses the first spring 50 to protrude outwardly, such that the brake shoe 300 presses tightly against the brake drum 200, to achieve the purpose of braking. The larger the pressure of the hydraulic oil in the first oil chamber 33 is, the more the first piston 30 is oppressed to protrude outwardly, and the larger the braking force is.

④ when the foot brake valve is controlled to reduce the pressure of the hydraulic oil in the first oil chamber 33, the elastic force of the first spring 50 is released, so as to push the first piston 30 to retract and drive the brake shoe 300 to depart from the brake drum 200, to achieve the purpose of relieving the braking.

⑤ as shown in FIG. 13, when the foot brake valve is controlled to continuously increase the pressure in the first oil chamber 33, the first piston 30 continues to oppress the first spring 50 to protrude outwardly, and when the first piston 30 moves to the set position, namely, the braking force is maximum, the first oil chamber 33 is communicated with the oil drainage interface 14, the high-pressure oil flows back to the oil tank via the oil drainage interface 14, and the pressure in the first oil chamber 33 is reduced. When the pressure in the first oil chamber 33 is lower than the elastic force of the first spring 60, the first spring 60 compresses the first piston 30 to retract, then the first piston 30 drives the brake shoe 300 and the brake drum 200 to be separated. The first piston 30 retracts to close off the oil drainage interface 14, then the pressure in the first oil chamber 33 increases again to push the first piston 30 to protrude outwardly. Thus in such reciprocation, the braking and releasing of braking are constantly repeated, which achieves the purpose of braking and the purpose of anti-lock.

Figure 15B:
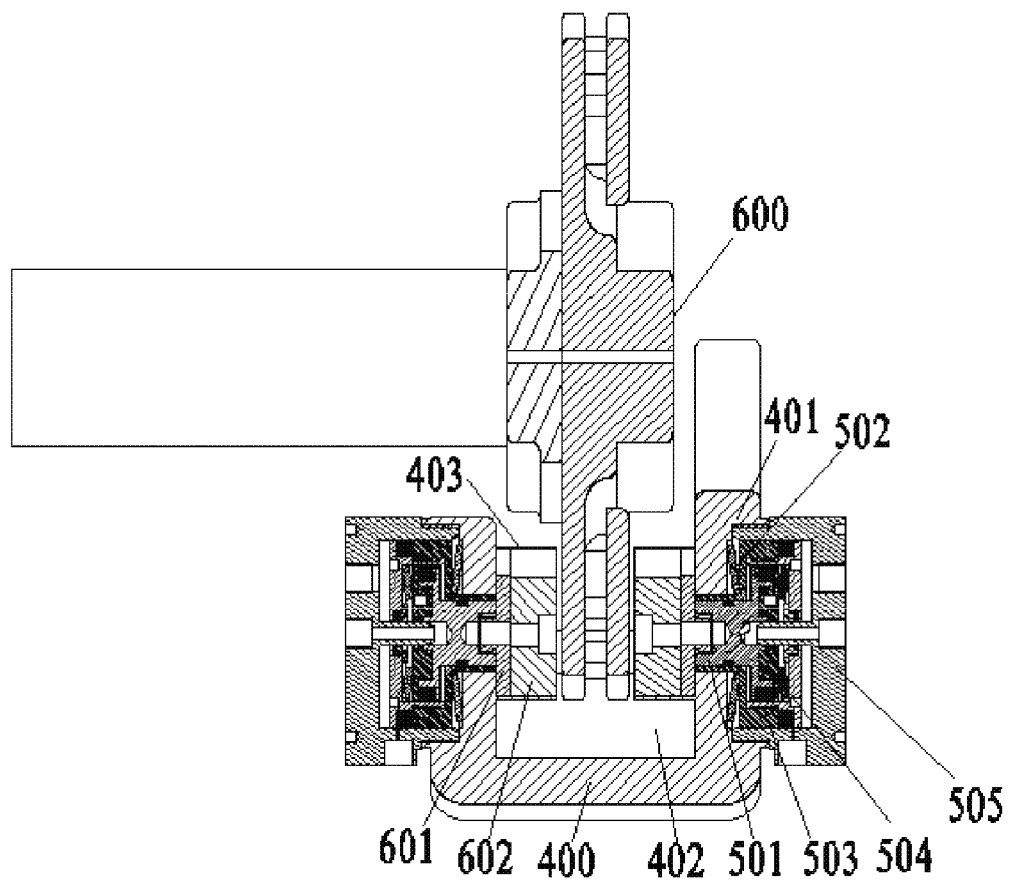

The present invention provides a structure of a second embodiment of a braking system. The braking system is a braking system of a disc-type brake axle which applies the brake wheel cylinder of the present invention. The braking system can include: an oil tank, an oil pump, a foot control valve, a hand control valve, a pipeline, a hydraulic anti-lock brake wheel cylinder fixing seat and a hydraulic anti-lock brake wheel cylinder, a brake pad, a brake rubber-block and the like. As shown in FIGS. 15a and 15b, the hydraulic anti-lock brake wheel cylinder fixing seat 400 has two side walls 401 that are disposed to be opposite to each other, and a housing cavity 402 is formed between the two side walls. The housing cavity 402 houses a brake disc 600. The brake disc 600 is driven by the axle to rotate. The two side walls of the fixing seat 400 can house more than one hydraulic anti-lock brake wheel cylinder, which runs through and is fixed on a side wall 401 of the hydraulic anti-lock brake wheel cylinder fixing seat 400. A second piston 501 of the hydraulic anti-lock brake wheel cylinder is disposed to be opposite to the brake disc 600, and the second piston 501 is further connected with a brake pad 602 which is fixedly connected with a brake rubber-block 603. The brake pad 602 and the brake rubber-block 603 form a brake block. An inner side wall of the hydraulic anti-lock brake wheel cylinder fixing seat 400 is further provided with a guide block 403 of the brake pad 602 and the brake rubber-block 603. During the traveling of an automobile, the brake block can be driven by the hydraulic anti-lock brake wheel cylinder to clamp or release the brake disc 600, so as to realize the braking or release of the braking of the automobile. It can be understood that, at this time the structure of this hydraulic anti-lock brake wheel cylinder can be reflected from the structure of the previous hydraulic anti-lock brake wheel cylinder, and has the only difference in that this hydraulic anti-lock brake wheel cylinder does not have an end cover, but has the side wall 401 of the fixing seat 400. To be specific, the side wall 401 of the fixing seat 400 is provided with a housing hole that runs through the side wall 401. The housing hole is a step hole. A step hole that is close to an inner side of the side wall 401 has a small hole diameter which is substantially equal to an outer diameter of the first piston rod. A step hole that is close to an outer side of the side wall 401 has a large hole diameter which is substantially equal to the outer diameter of the cylinder body, thus a step portion is formed between the small hole diameter and the large hole diameter. When installing the hydraulic anti-lock brake wheel cylinder, firstly the second piston 501 and the second spring 502 are housed in the second cavity of the first piston 503, then the first piston 503 and the second piston 501 pass through the housing hole, and the first spring 504 is disposed between the first piston rod and the step portion. One end of the second piston 501 is sequentially connected to the brake pad 602 and the brake rubber-block 603. Finally the cylinder body 505 is sleeved on the first piston 503, and an outer end of the first cavity of the cylinder body 505 protrudes into the housing hole, and is fixedly connected with the inner wall of the cylinder body 505 by the inner wall of the housing hole, which is preferably in thread connection. Since the outer end of the first cavity of the cylinder body abuts the step hole, and the inner wall of the step hole is fixedly connected with the outer wall of the cylinder body, such that the hydraulic anti-lock brake wheel cylinder does not need an end cover to seal the cylinder body, but seals the cylinder body by the side wall 401.

Figure 16:
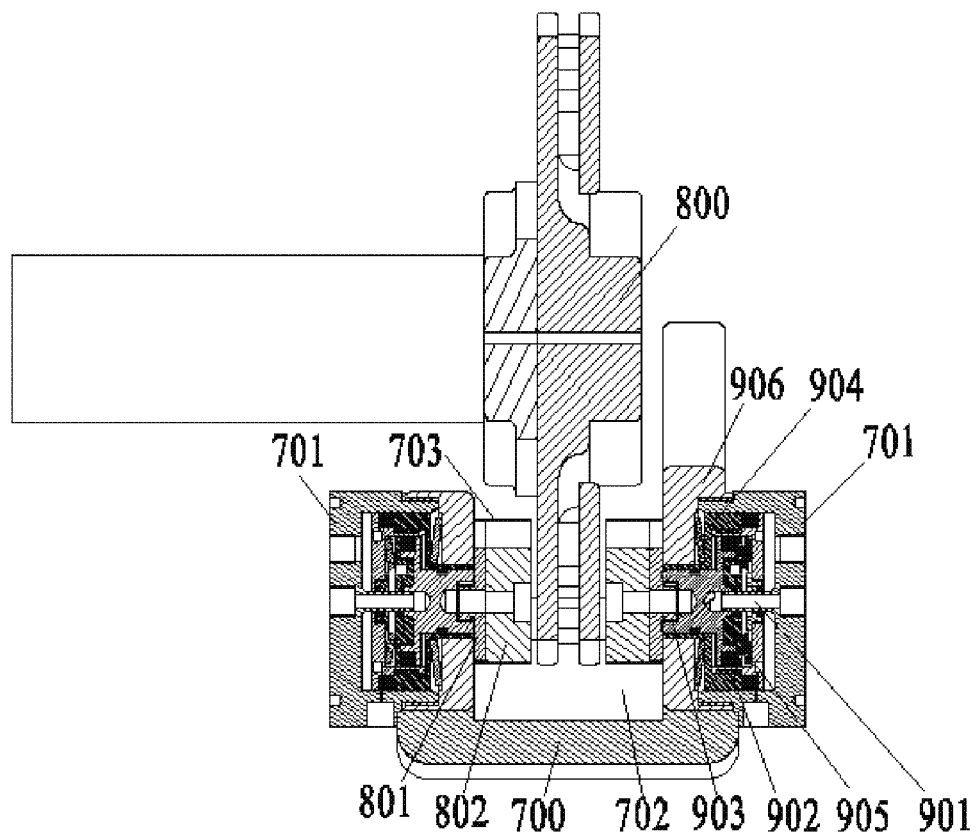
FIG. 16 is a sectional structural schematic of another embodiment of a disc-type braking system according to the present invention.

Furthermore, the present invention further provides a structure of a third embodiment of a braking system. The braking system is a braking system of a disc-type brake axle which applies the brake wheel cylinder of the present invention. The braking system can include: an oil tank, an oil pump, a foot control valve, a hand control valve, a pipeline, a hydraulic anti-lock brake wheel cylinder fixing seat and a hydraulic anti-lock brake wheel cylinder, a brake pad, a brake rubber-block and the like. As shown in FIG. 16, the fixing seat 700 has two side walls 701 that are disposed to be opposite to each other, and a housing cavity 702 is formed between the two side walls 701. The housing cavity 702 houses a brake disc 800. The two side walls 701 of the fixing seat 700 are provided with the guide block 703 of the brake block consisting of a brake pad 801 and a brake rubber-block 802. The two side walls 701 of the fixing seat 700 can also be provided with more than one first cavity extending from an inner side to an outer side. The outer side of the side wall 701 is provided with the first oil chamber interface, the second oil chamber interface and the oil drainage interface.

The hydraulic anti-lock brake wheel cylinder comprises: a core tube 901, a first piston 902, a second piston 903, a first spring 904, a second spring 905 and an end cover 906. The end cover 906 is fixedly connected with an opening end of the first cavity. The first piston 902 is disposed in the first cavity, and the first spring 904 is disposed between the first piston 902 and the end cover 906. A first oil chamber is formed between the bottom of the first piston 902 and the bottom of the first cavity. The first oil chamber interface is communicated with the first oil chamber at one end thereof, and is connected to a foot brake valve at the other end. The amount of oil flowing from the first oil chamber interface into the first oil chamber is controlled by the foot brake valve. The first piston 902 is provided with a second cavity in which the second piston 903 is positioned, and a second oil chamber is formed between the second piston 903 and the top of the second cavity. The second spring 905 is disposed between the bottom of the second piston 903 and the bottom of the second cavity. One end of the core tube 901 is connected to a hand brake valve, and the other end thereof passes through the second oil chamber interface and is communicated with the second oil chamber, and the amount of oil flowing from the core tube into the second oil chamber is controlled by the hand brake valve. The oil drainage interface is communicated with the first oil chamber when the pressure of the first oil chamber increases and pushes the first piston to move outwardly to a set position.

Furthermore, for the convenience of installation of the hydraulic anti-lock brake wheel cylinder, the two side walls of the fixing seat 700 are disposed separately, and the two side walls are fixedly connected at the bottom thereof, such that a housing cavity is formed between the two side walls. Firstly the hydraulic anti-lock brake wheel cylinder is installed on the side walls, and then the side walls are fixedly connected.

By adopting the brake wheel cylinder of the present invention, the traveling braking and parking braking of the disc-type brake axle can be realized, so as to realize the purpose of braking and the purpose of anti-lock.

By adopting the hydraulic anti-lock brake wheel cylinder of the above-described structure, when the hydraulic oil flows from the oil tank through the oil pump, the pipeline, the first oil chamber interface and the second oil chamber interface of the cylinder body into the installed and the debugged hydraulic anti-lock traveling brake wheel cylinder:

① when the hand brake valve and the foot brake valve are both closed, the first piston 30 adjoins the bottom of the first cavity 11 of the cylinder body 10 under the pressure of the first spring 50, and the second piston 40 extends outwardly under the pressure of the second spring 60, such that the brake block and the brake disc are in closed connection state, and thus the vehicle is in braking.

② as shown in FIG. 2, taking the movement process of the right-half structure of the cylinder body 10 in FIG. 2 as an example, under the control of the hand brake valve, the hydraulic oil flows into the cylinder body 10 via the second oil chamber interface 13, and flows into the second oil chamber 43 through the core tube in the cylinder body 10. As the pressure of the hydraulic oil in the second oil chamber 43 increases, the second piston 40 oppresses the second spring 60 to move along the negative direction of the x-axis so as to drive the brake block and the brake disc to be separated, thus the parking braking of the vehicle is released, and the vehicle can travel.

③ as shown in FIG. 7, taking the movement process of the left-half structure of the cylinder body 10 in FIG. 7 as an example, in the traveling of the vehicle, under the control of the foot brake valve, the hydraulic oil flows into the first oil chamber 33 via the first oil chamber interface 12, at this time the hydraulic oil in the first oil chamber 33 oppresses the first piston 30, then the first piston 30 oppresses the first spring 50 to protrude outwardly, such that the brake block presses tightly against the brake disc to achieve the purpose of braking. The larger the pressure of the hydraulic oil in the first oil chamber 33 is, the more the first piston 30 is oppressed to protrude outwardly, and the larger the braking force is.

④ when the foot brake valve is controlled to reduce the pressure of the hydraulic oil in the first oil chamber 33, the elastic force of the first spring 50 is recovered, so as to push the first piston 30 to retract and drive the brake block to depart from the brake disc to achieve the purpose of relieving the braking.

⑤ as shown in FIG. 13, when the foot brake valve is controlled to continuously increase the pressure in the first oil chamber 33, the first piston 30 continues to oppress the first spring 50 to protrude outwardly, and when the first piston moves to the set position, namely, the braking force is maximum, the first oil chamber 33 is communicated with the oil drainage interface 14, the high-pressure oil flows back to the oil tank via the oil drainage interface 14, and the pressure in the first oil chamber 33 is reduced. When the pressure in the first oil chamber 33 is lower than the elastic force of the first spring 60, the first spring 60 compresses the first piston 30 to retract, then the first piston 30 drives the brake block and the brake disc to be separated. The first piston 30 retracts to close off the oil drainage interface 14, then the pressure in the first oil chamber 33 increases again to push the first piston 30 to protrude outwardly. Thus in such reciprocation, the braking and releasing of braking are constantly repeated, which achieves the purpose of braking and the purpose of anti-lock.

The above contents are merely preferred embodiments of the present invention, and are not intended to limit the present invention. Any modifications, equivalent replacements, improvements and the like within the spirit and principle of the present invention shall be included within the protection scope of the present invention.

What is claimed is:

1. A hydraulic anti-lock brake wheel cylinder, comprising: a cylinder body, a core tube, a first piston, a second piston, a first spring, a second spring and an end cover; wherein,
   the cylinder body is provided with a first cavity, a first oil chamber interface, a second oil chamber interface and an oil drainage interface, the end cover being disposed at an opening end of the first cavity;
   the first piston is disposed in the first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;
   the first piston is provided with a second cavity in which the second piston is positioned, and a second oil chamber is formed between the second piston and a top of the second cavity, the second spring is disposed between a bottom of the second piston and a bottom of the second cavity;
   one end of the core tube is connected to a hand brake valve, and the other end thereof passes through the second oil chamber interface and is communicated with the second oil chamber, and the amount of oil flowing from the core tube into the second oil chamber is controlled by the hand brake valve;
   the oil drainage interface is communicated with the first oil chamber when the pressure of the first oil chamber increases and pushes the first piston to move outwardly to a set position.

2. The hydraulic anti-lock brake wheel cylinder according to claim 1, wherein, the cylinder body includes one first cavity, two first cavities or three or more first cavities, and the first piston, the second piston, the first spring, the second spring and the end cover have the same number as the first cavity of the cylinder body; when the number of the first cavity is in plural, the number of the first oil chamber interface is in plural as well, each first oil chamber interface is correspondingly communicated with the first oil chamber, or one end of the first oil chamber interface that is communicated with the first oil chamber is divided into a plurality of branches, and each of the branches is correspondingly communicated with the first oil chamber; when the number of the first cavity is in plural, the number of the second oil chamber interface is in plural as well, each of the second oil chamber interfaces is correspondingly communicated with the second oil chamber, or one end of the second oil chamber interface that is communicated with the second oil chamber is divided into a plurality of branches, and each branch is correspondingly communicated with the core tube and the second oil chamber;
   when the number of the first cavity is in plural, the number of the oil drainage interface is in plural as well, each of the oil drainage interfaces is correspondingly communicated with an oil return pipeline, or one end of the oil drainage interface that is communicated with the first oil chamber is divided into a plurality of branches, and each branch is correspondingly communicated with the first oil chamber.

3. The hydraulic anti-lock brake wheel cylinder according to claim 2, wherein, the first cavities in the cylinder body are arranged in the same direction, arranged in opposite directions, arranged to face each other, arranged in double rows or in a single row, arranged in multiple directions.

4. The hydraulic anti-lock brake wheel cylinder according to claim 1, wherein, the first piston is provided with a first through hole through which the core tube passes, the second piston is provided with a second through hole through which the core tube passes and a second oil chamber inlet passage, the second oil chamber inlet passage is communicated with the second through hole and the second oil chamber, respectively; the core tube is connected via the second oil chamber interface, and passes through the first through hole of the first piston, the second through hole of the second piston, and the second oil chamber inlet passage to allow hydraulic oil to flow into and out of the second oil chamber.

5. The hydraulic anti-lock brake wheel cylinder according to claim 4, wherein, the first piston includes a first piston body and a first piston rod that are disposed separately, a sealing device is disposed on an outer wall of the first piston body; the first piston body is provided with two side faces which are disposed to be opposite to each other, one side face that abuts the bottom of the first cavity is a first side face, the other side face is a second side face, the first side face is provided with the first through hole through which the core tube passes, a sealing device is disposed at the first through hole; the first piston rod includes a sleeve and a fixing part that extends along an edge of the sleeve, the fixing part is fixedly connected with the first piston body; the first piston body is provided therein with the second cavity, and the second cavity consists of a housing space that extends vertically to the second side face in the first piston body and the sleeve.

6. The hydraulic anti-lock brake wheel cylinder according to claim 4, wherein, the first piston includes a first piston press cover, a first piston rod that are disposed separately and a sealing screw that is fixedly connected on the first piston press cover; wherein, the first piston press cover includes a first cover plate, a first annular wall that extends outwardly from one side of the first cover plate is formed to be perpendicular to the first cover plate; the first cover plate is further provided with the first through hole that runs through the first cover plate at a center thereof; the sealing screw is provided with a through hole at a center thereof, and an outer wall of the sealing screw is fixedly connected with an inner wall of the first through hole, and the inner wall of the sealing screw is provided with a sealing slot for housing a sealing device;

the first piston rod includes a first sleeve and a fixing part that is formed by extending from one end of the first sleeve, the fixing part is sleeved on the first annular wall and is fixedly connected with the first annular wall; a top end of the fixing part, an outer wall of the first annular wall and the cover plate are enclosed to form a sealing slot for housing a sealing device; the first cover plate, an inner wall of the first annular wall, an inner wall of the fixing part and an inner wall of the first sleeve are enclosed to form the second cavity for housing the second piston.

7. The hydraulic anti-lock brake wheel cylinder according to claim 6, wherein, the second piston is provided with a second piston body and a second piston rod, and the second piston body is housed in the first piston body, the second piston rod is housed in the first sleeve of the first piston rod, an outer wall of the second piston body is provided with a sealing device; the second piston body is provided with the second through hole through which the core tube passes and the second oil chamber inlet passage, the second through hole is communicated with the second oil chamber inlet passage, and a sealing device is disposed at the second through hole.

8. The hydraulic anti-lock brake wheel cylinder according to claim 4, wherein, the second piston includes a second piston press cover and a second piston body that are disposed separately; wherein, the second piston press cover includes a second cover plate, a boss that extends outwardly from one side of the second cover plate is formed to be perpendicular to the second cover plate; the second cover plate is provided with the second through hole that runs through the second cover plate and the boss at a center thereof; the second through hole is provided with a sealing slot for housing a sealing device at the circumference thereof;

the second piston body includes a third cover plate, the third cover plate has two opposite sides, a second piston rod that extends perpendicularly to the third cover plate outwardly is formed on one side of the third cover plate, and a second annular wall that extends perpendicularly to the third cover plate outwardly is formed on the other side of the third cover plate; the second annular wall is sleeved on the boss and is fixedly connected with the boss; the second cover plate, an outer wall of the second annular wall and the third cover plate are enclosed to form a sealing slot for housing a sealing device; the third cover plate is provided with the second oil chamber inlet passage at a center thereof, and the second oil chamber inlet passage is communicated with the second through hole.

9. The hydraulic anti-lock brake wheel cylinder according to claim 1, wherein, a press cover is further included, the press cover is positioned at an inner side of the end cover, and the press cover abuts an inner wall of the cylinder body, and a sealing device is disposed between the press cover and the inner wall of the cylinder body, the first spring is disposed between the first piston and the press cover.

10. The hydraulic anti-lock brake wheel cylinder according to claim 1, wherein, the first spring and/or the second spring are/is a bellevill spring.

11. An axle braking system, comprising: an oil tank, an oil pump, a foot control valve, a hand control valve, a pipeline, a brake shoe, a brake drum and a hydraulic anti-lock brake wheel cylinder; wherein, the oil tank is filled with hydraulic oil which flows through the oil pump and the pipeline into the hydraulic anti-lock brake wheel cylinder, the brake shoe is positioned at an inner side of the brake drum, and the brake shoe abuts or is separated from the brake drum by being driven by the hydraulic anti-lock brake wheel cylinder;

the hydraulic anti-lock brake wheel cylinder comprises: a cylinder body, a core tube, a first piston, a second piston, a first spring, a second spring and an end cover; wherein, the cylinder body is provided with a first cavity, a first oil chamber interface, a second oil chamber interface and an oil drainage interface, the end cover being disposed at an opening end of the first cavity;

the first piston is disposed in the first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;

the first piston is provided with a second cavity in which the second piston is positioned, and a second oil chamber is formed between the second piston and a top of the second cavity, the second spring is disposed between a bottom of the second piston and a bottom of the second cavity;

one end of the core tube is connected to a hand brake valve, and the other end thereof passes through the second oil chamber interface and is communicated with the second oil chamber, and the amount of oil flowing from the core tube into the second oil chamber is controlled by the hand brake valve;

the oil drainage interface is communicated with the first oil chamber when the pressure of the first oil chamber increases and pushes the first piston to move outwardly to a set position.

12. The axle braking system according to claim 11, wherein, the cylinder body includes one first cavity, two first cavities or three or more first cavities, and the first piston, the second piston, the first spring, the second spring and the end cover have the same number as the first cavity of the cylinder body; when the number of the first cavity is in plural, the number of the first oil chamber interface is in plural as well, each first oil chamber interface is correspondingly communicated with the first oil chamber, or one end of the first oil chamber interface that is communicated with the first oil chamber is divided into a plurality of branches, and each of the branches is correspondingly communicated with the first oil chamber; when the number of the first cavity is in plural, the number of the second oil chamber interface is in plural as well, each of the second oil chamber interfaces is correspondingly communicated with the second oil chamber, or one end of the second oil chamber interface that is communicated with the second oil chamber is divided into a plurality of branches, and each branch is correspondingly communicated with the core tube and the second oil chamber;

when the number of the first cavity is in plural, the number of the oil drainage interface is in plural as well, each of the oil drainage interfaces is correspondingly communicated with an oil return pipeline, or one end of the first oil drainage interface that is communicated with the first oil chamber is divided into a plurality of branches, and each branch is correspondingly communicated with the first oil chamber.

13. The axle braking system according to claim 12, wherein, the first cavities in the cylinder body are arranged in the same direction, arranged in opposite directions, arranged to face each other, arranged in double rows or in a single row, arranged in multiple directions.

14. The axle braking system according to claim 11, wherein, the first piston is provided with a first through hole through which the core tube passes, the second piston is provided with a second through hole through which the core tube passes and a second oil chamber inlet passage, the second oil chamber inlet passage is communicated with the second through hole and the second oil chamber, respectively; the core tube is connected via the second oil chamber interface, and passes through the first through hole of the first piston, the second through hole of the second piston, and the second oil chamber inlet passage to allow hydraulic oil to flow into and out of the second oil chamber.

15. The axle braking system according to claim 14, wherein, the first piston includes a first piston body and a first piston rod that are disposed separately, a sealing device is disposed on an outer wall of the first piston body; the first piston body is provided with two side faces which are disposed to be opposite to each other, one side face that abuts the bottom of the first cavity is a first side face, the other side face is a second side face, the first side face is provided with the first through hole through which the core tube passes, a sealing device is disposed at the first through hole; the first piston rod includes a sleeve and a fixing part that extends along an edge of the sleeve, the fixing part is fixedly connected with the first piston body; the first piston body is provided therein with the second cavity, and the second cavity consists of a housing space that extends vertically to the second side face in the first piston body and the sleeve.

16. The axle braking system according to claim 14, wherein, the first piston includes a first piston press cover, a first piston rod that are disposed separately and a sealing screw that is fixedly connected on the first piston press cover; wherein, the first piston press cover includes a first cover plate, a first annular wall that extends outwardly from one side of the first cover plate is formed to be perpendicular to the first cover plate; the first cover plate is further provided with the first through hole that runs through the first cover plate at a center thereof; the sealing screw is provided with a through hole at a center thereof, and an outer wall of the sealing screw is fixedly connected with an inner wall of the first through hole, and the inner wall of the sealing screw is provided with a sealing slot for housing a sealing device;

the first piston rod includes a first sleeve and a fixing part that is formed by extending from one end of the first sleeve, the fixing part is sleeved on the first annular wall and is fixedly connected with the first annular wall; a top end of the fixing part, an outer wall of the first annular wall and the cover plate are enclosed to form a sealing slot for housing a sealing device; the first cover plate, an inner wall of the first annular wall, an inner wall of the fixing part and an inner wall of the first sleeve are enclosed to form the second cavity for housing the second piston.

17. The axle braking system according to claim 16, wherein, the second piston is provided with a second piston body and a second piston rod, and the second piston body is housed in the first piston body, the second piston rod is housed in the first sleeve of the first piston rod, an outer wall of the second piston body is provided with a sealing device; the second piston body is provided with the second through hole through which the core tube passes and the second oil chamber inlet passage, the second through hole is communicated with the second oil chamber inlet passage, and a sealing device is disposed at the second through hole.

18. The axle braking system according to claim 14, wherein, the second piston includes a second piston press cover and a second piston body that are disposed separately; wherein, the second piston press cover includes a second cover plate, a boss that extends outwardly from one side of the second cover plate is formed to be perpendicular to the second cover plate; the second cover plate is provided with the second through hole that runs through the second cover plate and the boss at a center thereof; the second through hole is provided with a sealing slot for housing a sealing device at the circumference thereof;

the second piston body includes a third cover plate, the third cover plate has two opposite sides, a second piston rod that extends perpendicularly to the third cover plate outwardly is formed on one side of the third cover plate, and a second annular wall that extends perpendicularly to the third cover plate outwardly is formed on the other side of the third cover plate; the second annular wall is sleeved on the boss and is fixedly connected with the boss; the second cover plate, an outer wall of the second annular wall and the third cover plate are enclosed to form a sealing slot for housing a sealing device; the third cover plate is provided with the second oil chamber inlet passage at a center thereof, and the second oil chamber inlet passage is communicated with the second through hole.

19. An axle braking system, wherein, the braking system is a braking system applied on a disc-type braking axle;
    the braking system includes: a hydraulic anti-lock brake wheel cylinder fixing seat and a hydraulic anti-lock brake wheel cylinder, a brake pad, a brake rubber-block and a brake disc; two side walls of the fixing seat are provided with the brake pad and a guide block of a brake block consisting of the brake pad; the fixing seat has two side walls that are disposed to be opposite to each other, and a housing cavity for housing the brake disc is formed between the two side walls; the two side walls of the fixing seat are provided with more than one housing holes that run through the side walls from an outer side to an inner side, and the housing holes are step holes and include a first housing hole with a large hole diameter, a second housing hole with a small hole diameter and a step portion connecting the first housing hole and the second housing hole, the housing holes are used for housing the hydraulic anti-lock brake cylinder;
    the hydraulic anti-lock brake wheel cylinder comprises: a cylinder body, a core tube, a first piston, a second piston, a first spring and a second spring; wherein,
    the cylinder body is provided with a first cavity, a first oil chamber interface, a second oil chamber interface and an oil drainage interface; an inner wall of the first housing hole is fixedly connected with an outer wall of the cylinder body so as to seal the first cavity;
    the first piston is disposed in the first cavity, and the first spring is disposed between the first piston and the step portion, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;
    the first piston is provided with a second cavity in which one end of the second piston is positioned, and a second oil chamber is formed between one end of the second piston and a top of the second cavity, the second spring is further disposed between a bottom of the second piston and a bottom of the second cavity; the other end of the second piston passes through the first housing hole and protrudes into the housing cavity to be connected with the brake pad, the brake pad is fixedly connected with the brake rubber-block;
    one end of the core tube is connected to a hand brake valve, and the other end thereof passes through the second oil chamber interface and is communicated with the second oil chamber, and the amount of oil flowing from the core tube into the second oil chamber is controlled by the hand brake valve; and
    the oil drainage interface is communicated with the first oil chamber when the pressure of the first oil chamber increases and pushes the first piston to move outwardly to a set position.

20. The axle braking system according to claim 19, wherein, the two side walls of the fixing seat can be provided separately, and the bottom of the two side walls are fixedly connected when the two side walls are provided separately, so as to form a housing cavity between the two side walls.

21. An axle braking system, wherein, the braking system is a braking system applied on a disc-type braking axle;
    the braking system includes: a hydraulic anti-lock brake wheel cylinder fixing seat and a hydraulic anti-lock brake wheel cylinder, a brake pad, a brake rubber-block and a brake disc; the fixing seat including two sidewalls is provided with the brake pad and a guide block of a brake block consisting of the brake rubber-block; the two sidewalls of the fixing seat are disposed to be opposite to each other, and a housing cavity for housing the brake disc is formed between the two side walls; the two side walls of the fixing seat can also be provided with more than one first cavity extending from an inner side to an outer side; a first oil chamber interface, a second oil chamber interface and an oil drainage interface are disposed at the outer side of the side walls;
    the hydraulic anti-lock brake wheel cylinder comprises: a core tube, a first piston, a second piston, a first spring, a second spring and an end cover, wherein, the end cover is fixedly connected with an opening end of the first cavity;
    the first piston is disposed in a first cavity, and the first spring is disposed between the first piston and the end cover, a first oil chamber is formed between a bottom of the first piston and a bottom of the first cavity; the first oil chamber interface is communicated with the first oil chamber at one end thereof, and is connected to a foot brake valve at the other end; the amount of oil flowing from the first oil chamber interface into the first oil chamber is controlled by the foot brake valve;
    the first piston is provided with a second cavity in which the second piston is positioned, and a second oil chamber is formed between the second piston and a top of the second cavity, the second spring is disposed between a bottom of the second piston and a bottom of the second cavity;
    one end of the core tube is connected to a hand brake valve, and the other end thereof passes through the second oil chamber interface and is communicated with the second oil chamber, and the amount of oil flowing from the core tube into the second oil chamber is controlled by the hand brake valve; and
    the oil drainage interface is communicated with the first oil chamber when the pressure of the first oil chamber increases and pushes the first piston to move outwardly to a set position.

22. The axle braking system according to claim 21, wherein, the two side walls of the fixing seat can be provided separately, and the bottom of the two side walls are fixedly connected when the two side walls are provided separately, so as to form a housing cavity between the two side walls.

* * * * *